(12) United States Patent
Schiedermeier

(10) Patent No.: US 11,921,538 B2
(45) Date of Patent: Mar. 5, 2024

(54) METHOD FOR OPERATING AT LEAST TWO INVERTERS CONNECTED TO A DIRECT CURRENT NETWORK AND MOTOR VEHICLE

(71) Applicant: AUDI AG, Ingolstadt (DE)

(72) Inventor: Maximilian Schiedermeier, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 232 days.

(21) Appl. No.: 17/448,032

(22) Filed: Sep. 17, 2021

(65) Prior Publication Data

US 2022/0091630 A1 Mar. 24, 2022

(30) Foreign Application Priority Data

Sep. 21, 2020 (DE) .......................... 102020124496.7

(51) Int. Cl.
| | |
|---|---|
| *G06F 1/12* | (2006.01) |
| *G06F 1/10* | (2006.01) |
| *H04L 12/40* | (2006.01) |
| *H02M 7/44* | (2006.01) |

(52) U.S. Cl.
CPC .................. *G06F 1/12* (2013.01); *G06F 1/10* (2013.01); *H04L 12/40* (2013.01); *H02M 7/44* (2013.01); *H04L 2012/40215* (2013.01); *H04L 2012/40273* (2013.01)

(58) Field of Classification Search
CPC ....................................................... G06F 1/12
See application file for complete search history.

(56) References Cited

U.S. PATENT DOCUMENTS

| | | | |
|---|---|---|---|
| 10,520,906 B2 * | 12/2019 | Tamashima | ............... H02P 5/46 |
| 10,566,838 B2 * | 2/2020 | Covic | ..................... B60L 53/12 |
| 2002/0132144 A1 * | 9/2002 | McArthur | ............. G06Q 30/06 |
| | | | 429/513 |
| 2008/0284710 A1 * | 11/2008 | Kimura | ............... H01L 27/1218 |
| | | | 345/98 |
| 2012/0235617 A1 | 9/2012 | Singh | |
| 2014/0361613 A1 * | 12/2014 | Huang | .................... H02M 1/14 |
| | | | 307/12 |
| 2019/0013748 A1 * | 1/2019 | Barrenscheen | ........... H02P 6/10 |

FOREIGN PATENT DOCUMENTS

| | | |
|---|---|---|
| CN | 104242739 A | 12/2014 |
| CN | 110138283 A | 8/2019 |
| EP | 1906518 A2 | 4/2008 |
| EP | 1995863 A2 | 11/2008 |
| EP | 2811633 A2 | 12/2014 |

* cited by examiner

*Primary Examiner* — Phil K Nguyen
(74) *Attorney, Agent, or Firm* — Seed IP Law Group LLP

(57) ABSTRACT

A method includes operating at least two inverters connected to a direct current network. Each inverter includes a control unit connected to a common communication bus and in each case at least one switching element, which is controlled by the control unit of the inverter with a clock signal. The common communication bus is connected to at least one further control unit, which in each case sends a message of a message type via the communication bus at different points of times. The reception of one of the messages of the message type in the control units of the inverters triggers a synchronization of their clock signals.

12 Claims, 2 Drawing Sheets

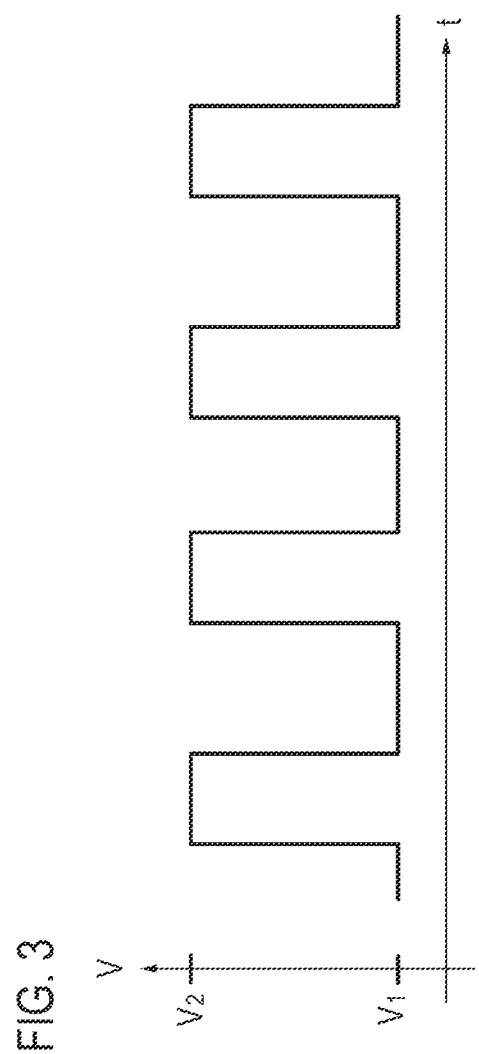

METHOD FOR OPERATING AT LEAST TWO INVERTERS CONNECTED TO A DIRECT CURRENT NETWORK AND MOTOR VEHICLE

BACKGROUND

Technical Field

The disclosure relates to a method for operating at least two inverters connected to a direct current network, wherein the inverters each include a control unit connected to a common communication bus and at least one switching element each, which switching element is controlled by the control unit of the inverter with a clock signal. The disclosure furthermore relates to a motor vehicle.

Description of the Related Art

In motor vehicles with electric drives, three-phase machines are generally used as traction motors. In this regard, it is known that a motor vehicle with electric drive may have a plurality of traction motors. The traction motors are usually controlled by inverters, wherein the inverters convert a direct current output from a traction battery of the motor vehicle, or alternatively a direct current provided by a fuel cell system of the motor vehicle, into an alternating current for operating the traction motors. In a motor vehicle with multiple traction motors, the inverters operating the traction motors are usually connected in parallel with the traction battery or the fuel cell system.

An inverter designed, for example, as a pulse inverter generally includes several semiconductor switches for generating or alternatively regulating the motor voltage operating the traction motor. The switching of these semiconductor switches may cause an alternating current load or ripple to occur in the direct current network, such that the inverters each include a capacitor connected in parallel with an input of the inverter connected to the direct current network, also referred to as an intermediate circuit capacitor. This capacitor serves to dissipate the alternating current ripples in the direct current network and to achieve decoupling of the inverter from the traction battery or alternatively the fuel cell system.

In order to exercise influence on the disturbances arising in the direct current network, it is desirable in the case of several inverters connected to a direct current network, which inverters control the semiconductor switching elements of the inverter at the same frequency, if, for example, there is a determined relationship between the clock signals. This may utilize synchronization of the control of the semiconductor switching elements of the inverters, which is to say, the alignment of their clock signals with respect to a defined point in time. Various approaches in this area are known from the prior art.

EP 1 906 518 A2 describes a method for synchronizing inverter units which are connected in parallel and designed to supply one or more windings of a motor. The inverter units are connected to one another via a communication link, wherein each inverter has its own modulation cycle counter. The modulation cycle counters are each synchronized by a message sent by a master inverter unit of the inverter units via the communication link. After synchronization, the master inverter unit sends the count of its own modulation cycle counter to the other inverters, which perform a correction of their own count results based on the value sent by the master inverter unit.

EP 1 995 863 A2 describes a control method for a synchronization and for a phase offset of a pulse width modulation strategy of power inverters. The inverters are thereby connected to a common high-voltage alternating current network, whereby in order to avoid undesired harmonics in the alternating current network, a fixed phase offset is formed between the control signals of the pulse width modulation of the respective inverters. For this purpose, the inverters are each operated by a control unit for setting of starting points and a further control unit for setting of the phase offset.

A method for synchronizing a plurality of inverters is known from CN 110138283 A. In doing so, one of the inverters is operated as a master inverter, which is connected to other inverters as slave inverters via a fieldbus. The slave inverters are thereby controlled by the master inverter.

BRIEF SUMMARY

The disclosure is based on the task of specifying an improved method for synchronizing at least two inverters connected to a direct current network.

According to the disclosure, in order to solve this task, in a method of the type mentioned here above, it is provided that the common communication bus is connected with at least one further control unit, which at different points in times sends a message of a message type via the communication bus, wherein a synchronization of their clock signal is in each case triggered through the reception of one of the messages of the message type in the control units of the inverters.

The further control unit, which is connected to the control units of the inverters via the communication bus, is thereby different from the control units of the inverters. The control units of the inverters each control the at least one switching element of the inverters with a clock signal. The clock signals of the inverters can, in particular, have at least substantially the same clock frequency or they can have clock frequencies which differ by an integral multiple.

In this context, at least substantially the same clock frequency means, in particular, that the control units have clocking elements, for example, quartz oscillators, which nominally have the same clock frequency but may have a difference from the specified nominal value due to component-related tolerances. Even though the tolerances of clocking elements or of quartz oscillators may be comparatively small with respect to the nominal value, a change in a phase relationship between the clock signals of the at least two inverters may occur after a certain time due to the high number of clockings during the period of operation of the at least two inverters. In other words, the control signals will diverge based on the tolerances or alternatively deviations of the clock elements starting from a synchronization point of time. This relationship can be described as $$\Delta \varphi \Delta_{Quartz} \cdot t \cdot 360°$$

where the angle $\Delta \varphi$ describes the shift between the control signals of two of the inverters, which occurs after a time t in the event of a deviation of the clock elements or the quartz oscillators from $\Delta_{Quartz}$.

For example, in the case of clocking elements which each have a nominal frequency of 10 kHz, due to tolerances of the clocking elements, one control unit can control the at least one switching element of one of the inverters at 9.9999 kHz and another control unit can control the at least one switching element of a further one of the inverters at 10.0001 kHz, so that a deviation of 0.0002 kHz or of one control cycle per 5 seconds occurs. Such a phase offset between the clock signals of two or more inverters, which occurs over time, can be compensated for by regular synchronization so that a fixed phase difference, or at least a phase difference that remains in a limited interval, can be maintained at least substantially for the duration of operation of the inverters. The values in the above example are given purely by way of example. In particular, the control units can each control the switching elements of the inverters with a frequency between 2 kHz and 40 kHz, in particular, between 10 kHz to 20 kHz. A different magnitude of the tolerances is likewise also in each case possible. Correspondingly, in the case of several clock signals which nominally differ by an integral multiple, a phase difference can also be formed if there is a slight deviation from the nominal clock frequency in one or more of the clock signals.

According to the disclosure, synchronization of the clock signals is performed by using messages of a message type sent by the at least one further control unit via the communication bus to synchronize the clock signals of the control units. Using the messages of the specific message type sent by the one or more further control unit(s) via the communication bus has the advantage that the use of additional synchronization networks or alternatively own synchronization messages can be dispensed with. This simplifies the synchronization of the inverters, since the provision of additional communication links and/or line connections for synchronizing the inverters can be dispensed with.

The synchronization of the inverters has the advantage that, for example, a predetermined reference between the clock signals of the control units, for example, a phase difference, can be maintained. This can, in particular, help reduce an alternating current load or ripple in the direct current network. The reduction of such disturbances has the advantage that capacitors in the inverters, which are connected in parallel with the input of the inverter connected to the direct current network, for example, as an intermediate circuit capacitor, can be used with lower capacitance. The use of capacitors with lower capacitance reduces the installation space to form the capacitor as well as the costs incurred to manufacture it. This has a correspondingly beneficial effect on the installation space utilized in each case for the inverters or on their manufacturing costs.

The inverters may, in particular, be pulse inverters, which, in particular, convert a direct current into a three-phase alternating current for operating an electric machine. The inverters may also be referred to in German as "Wechselrichter." The switching elements of the inverters may each be designed as a semiconductor switching element, for example, a metal-oxide-semiconductor field-effect transistor (MOSFET) or an insulating-gate bipolar transistor (IGBT). The inverters may be designed for bidirectional operation, so that conversion of an alternating current to a direct current, for example, to feed the direct current to an energy storage system connected to the direct current network, is also possible.

The method is not limited to the use of two inverters, but rather can also be performed with a larger number of inverters. Additionally or alternatively, the inverters may have more than three phases or a combination of multiple inverters, each with a different number of phases, may be operated using the method. The inverters may each have two voltage levels, for example, a positive high voltage potential and a negative high voltage potential. It is also possible that at least one of the inverters is designed as a multilevel inverter, which has more than two voltage levels.

According to the disclosure, it can be provided that the message sent by the further control device contains at least one control command and/or at least one information for at least one of the control units of the inverters and/or that the message transmitted by the further control device contains a control command and/or an item of information for a further device connected to the communication bus. The message sent by the further control device via the communication bus, which is used for synchronizing the control units of the inverters or their clock signals, can be a message of a message type which contains a control command and/or at least one item of information for one of the control units of the inverters, consequently a message of a message type which serves for the purpose of control or operation of the inverters. The control command and/or the information may include, for example, an operating state to be set by the respective control unit and/or a control specification to be used for the control of the at least one switching element of the inverter including the respective control unit. The message may thus correspond to a message type addressed to at least one of the control units.

Additionally or alternatively to this, it is also possible that a message of a message type is used which contains a control command and/or information for another device connected to the communication bus, consequently a message of a message type which is used to control or alternatively operate a device connected to the communication bus and that is different from the inverters. The message can therefore correspond to a message type which is not addressed to one of the control units or alternatively which is addressed to another device connected to the communication bus.

In particular, the messages transmitted via the communication bus are also read by the control units of the inverters, even if the messages do not contain any information or control commands for the inverters or the respective control unit. In this manner, it is possible to also use such a message of a message type for synchronization, the message content of such a message not having any further effect on the operation of the inverters.

In a preferred embodiment of the disclosure, it may be provided that the messages of the message type sent by the further control device are each resent again after a fixed or variable period of time. The messages sent by the further control device may, as a consequence, be messages which are sent on a regular basis, which is to say, at a fixed time interval, via the communication bus. Alternatively, it is possible that the time period that elapses between the sending of two successive messages from the further control device is variable, it can consequently depend on an operating state of the further control device and/or further devices connected to the communication bus.

When using a fixed period of time between the messages sent by the further control device, the synchronization also accordingly takes place in a fixed period of time. The fixed period of time, or alternatively the messages of the message type sent in each case after a fixed period of time can, in particular, be selected in such a way that, by the synchronization that is in each case repeated after the fixed period of time, a reference between the control signals such as a phase difference is at least substantially maintained, or kept within a desired interval.

In the case of a variable period of time between two messages transmitted by the further control device, the synchronization also accordingly takes place after this variable period of time. Provided that it is to be expected that the messages separated by a variable period of time are also sent regularly enough to be able to compensate for possible differences between the clock signals, or alternatively to maintain at least substantially a reference between the control signals, such as a phase difference, and/or to keep it within a desired interval, it is also sufficient for a synchronization of the control units of the inverters to use these messages for synchronization.

It may be provided according to the disclosure that the period of time is in an interval between 1 ms and 100 ms inclusive. In the case of a period of time that falls in this range, synchronization is even possible in the case of larger deviations, in particular, in the case of deviations which occur due to tolerances of a clock element, in particular, a quartz oscillator, this without too large deviations of the reference or the phase position of the clock signals occurring between the synchronization times. The message type used for synchronization can be selected, in particular, as a function of the period of time with which messages of the corresponding message type are sent on the communication bus. The slower the angle $\Delta\varphi$ described above changes, the longer the period of times between messages can be used.

According to the disclosure, it can be provided that the synchronization of the clock signals takes place on a rising edge or a falling edge of the message. The message sent by the further control device via the communication bus may, for example, have a level alternating between two voltage levels, so that the message has at least one rising edge or alternatively at least one falling edge. The synchronization of the clock signals may take place on a rising edge, for example, when reception begins, or on a falling edge, for example, when reception of the message is completed or complete. It is also possible that the synchronization takes place on a rising edge or a falling edge, which lies between the beginning and the end of the message.

According to the disclosure, it can be provided that the control units each count the control operations carried out after the synchronization, wherein one of the control units of the inverters is a master control unit which at a point in time transmits count information to the at least one control unit of the at least one further inverter, said count information describing the control operations counted at the point in time by the master control unit, wherein the at least one control unit receiving the count information controls the at least one switching element of the inverter including the receiving control unit, as a function of the count information and the control operations counted by the receiving control unit.

The transmission of the control operations counted by a master control unit to at least one further control unit can, in particular, be carried out via the communication bus. The control operations counted at the point in time by the master control unit since synchronization can be compared with the control operations counted at this point in time by the further control unit, which can also be referred to as the slave control unit, so that a measure of a difference between the clock frequencies of the clock signals of the control units is obtained. The further control unit or the slave control unit may determine the plausibility of and/or compensate the value of the transmitted number of control operations of the master control unit. For this purpose, the further control unit can control the at least one switching element of the further inverter as a function of the count information of the master control unit as well as a function of its own count information, so that consideration of the difference between the clock frequencies of the clock signals is made possible when controlling the at least one switching element of the further inverter.

In this way, a fixed phase reference between the clock signals can, in particular, be at least substantially maintained in the case of temporally fluctuating or temporally varying deviations of the clock frequencies. The point in time at which the master control unit sends the count information can, for example, be defined by a fixed reference to a previous synchronization time, so that in each case it is also known to the at least one receiving control unit. It is also possible that the point in time is variably determined by the master control unit, in which case the point in time associated with a transmitted number of control operations is transmitted as a part of the count information. Furthermore, good synchronization is made possible by the transmission of the count information, in particular, in cases where control of the control units or alternatively the inverters via the communication bus would not be possible or would be possible only to a limited extent due to a low clocking of the communication bus.

According to the disclosure, it can be provided that in each of the inverters the control of the at least one switching element with the clock signal takes place in relation to the time of synchronization as a function of a control specification assigned to the respective control unit. The control specifications of the individual control units of the different inverters can thereby, in particular, be different, so that the control of the switching elements of the different inverters can be carried out in different ways after the synchronization.

According to the disclosure, the control specification can be stored in the control units and/or, in particular, can be transmitted to the control units in a recurring manner via the communication bus. In this way, a control specification can be predefined for the respective control units of the different inverters and/or the control specification can be adapted, in particular, dynamically during operation of the inverters. An adapted control specification can be transmitted to one of the control units, in particular, via the communication bus, for example, by the further control unit or a control device designed to control the control units.

According to the disclosure, it can be provided that a phase difference between the clock signals of the control units is generated by the control specifications assigned to the control units, whereby the phase difference is set in such a way that an alternating current voltage load on the direct current network generated by the switching of the switching elements of the inverters is minimal or at least reduced. For example, a phase offset of $360°/n$ can be set between the individual clock signals of the control units at the same clock frequencies, where n describes the number of inverters that are accordingly controlled and connected via the communication bus. In addition to setting such a fixed phase difference or such a fixed phase offset, it is also possible to set different phase differences between the respective control signals of the at least two inverters, which can, in particular, be dynamically adapted by specifying the control specification via the communication bus.

According to the disclosure, it can be provided that the phase difference is determined as a function of a current operating state of at least one of the inverters and/or as a function of an operating state to be set of at least one of the inverters and/or as a function of a measured value describing a physical quantity in the direct current network. The phase difference to be set can be determined, for example, by the further control unit or by an additional control unit designed for operating the control units of the inverters and transmitted to the control units of the inverters via the communication bus. The current operating state of the inverters can, for example, relate to a current operating state of a respective electrical machine connected to the inverter. Correspondingly, the phase difference can also depend on an operating point to be set, which is to say to be implemented in the near future by the inverter, for example, when driving an electric machine. Additionally or alternatively, the phase difference can also be adjusted as a function of a physical quantity measured in the direct current network. This makes it possible, for example, to adjust the phase difference as a function of an alternating current load of the direct current network detected as a measured value.

In a preferred embodiment of the disclosure, it may be provided that two inverters, each operating a traction electric motor of a motor vehicle, are used and/or that a communication bus of a motor vehicle, in particular, a CAN bus or a FlexRay bus, is used. In particular, in the case of inverters each operating a traction electric motor of a motor vehicle, it is thus possible to reduce alternating current voltage ripples occurring in a direct current network, which act as interference voltage. Furthermore, the resulting reduction, in particular, in the capacitance of the capacitors of the inverters has a beneficial effect on both the manufacturing costs and the installation space utilized by the inverters. In addition to the cost reduction, this is particularly advantageous in a motor vehicle due to the limited installation space available.

According to the disclosure, it can be provided that two inverters are used, which inverters are coupled to a direct current network including an electrical energy storage system, in particular, a traction energy storage system of a motor vehicle, and/or at least one fuel cell system. A reduced alternating current voltage load or alternatively a reduced ripple has, in particular, a positive effect on electrical energy storage systems and/or on fuel cell systems, which are thereby advantageously subjected to less load during operation of the inverters.

For a motor vehicle according to the disclosure, it is provided that it includes two inverters connected to a direct current network, the inverters each including a control unit connected to a common communication bus and each including at least one switching element which can be controlled by the control unit of the inverter with a clock signal, the common communication bus being connected to at least one further control unit which is designed to send a message via the communication bus at different times, the control units of the inverters being designed to carry out a method according to the disclosure.

All of the advantages and embodiments described above with reference to the method according to the disclosure apply accordingly to the motor vehicle according to the disclosure.

BRIEF DESCRIPTION OF THE SEVERAL VIEWS OF THE DRAWINGS

Further advantages and details of the disclosure will be apparent from the embodiment examples described below and from the drawings. These drawings are schematic representations wherein:

FIG. 3 shows a representation of the transmission of a message on a communication bus.

DETAILED DESCRIPTION

Figure 1:
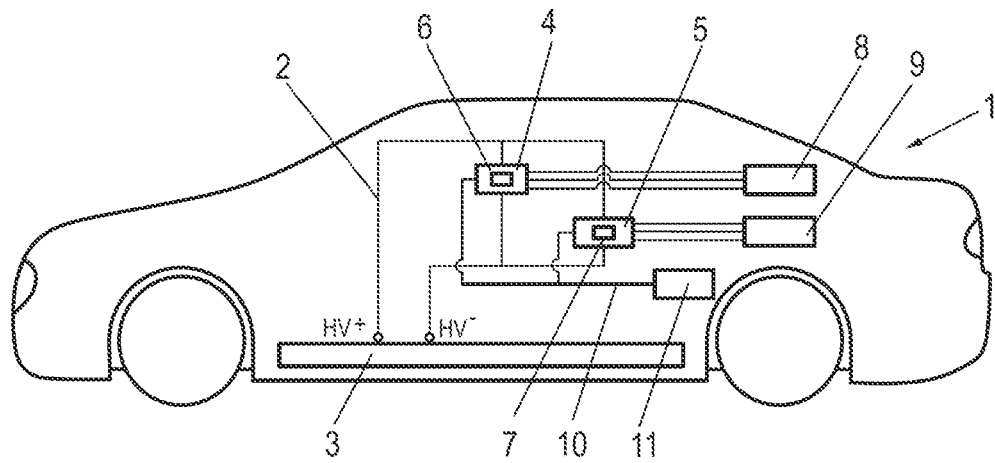
FIG. 1 shows an embodiment example of a motor vehicle according to the disclosure.

FIG. 1 shows an embodiment of a motor vehicle 1 according to the disclosure. The motor vehicle 1 includes a direct current network 2, in which an electrical energy storage system 3 designed as a traction battery is connected. Furthermore, two inverters 4, 5 designed as bi-directional pulse inverters are connected in parallel to the energy storage system 3 in the direct current network 2. Additionally or alternatively to the energy storage system 3, a fuel cell system can also be provided in the direct current network 2.

The inverters 4, 5 each respectively include a control unit 6 and 7. A direct current received from the electrical energy storage system 3 is converted by means of the inverter 4 into an alternating current for operating an electrical machine 8. Correspondingly, the direct current taken from the electrical energy storage system 3 is converted by means of the inverter 5 into an alternating current for operating an electrical machine 9. The electric machines 8, 9 are each implemented as a traction electric motor of the motor vehicle 1. The electric machines 8, 9 can, for example, each be associated with an axle or each with a wheel of the motor vehicle 1. In particular, it is possible for the motor vehicle 1 to include further inverters, which, in particular, can each fulfill the purpose of operating further traction electric motors, each assigned to an axle or a wheel of the motor vehicle.

The control units 6, 7 of the inverters 4, 5 are connected to a communication bus 10. A further control unit 11 is also connected to the communication bus 10, which control unit sends a message of a message type via the communication bus 10 at different times. The control units 6, 7 of the inverters 4, 5 are used, in each case, to control at least one switching element 12 of the inverters 4, 5 with a clock signal. The clock signals by means of which the control units 4, 5 control the respective switching elements 12 of their inverter 4 or alternatively 5 have, in particular, substantially the same clock frequency or at least substantially clock frequencies that differ by an integer multiple. In particular, the control units 4, 5 can each control the switching elements 12 of the inverters 6, 7 with a frequency between 2 kHz and 40 kHz, in particular, between 10 kHz to 20 kHz. The inverters 4, 5 are each designed as three-phase pulse inverters which convert the direct current provided by the energy storage system 3 into a three-phase alternating current for operating the electrical machines 8, 9.

Figure 2:
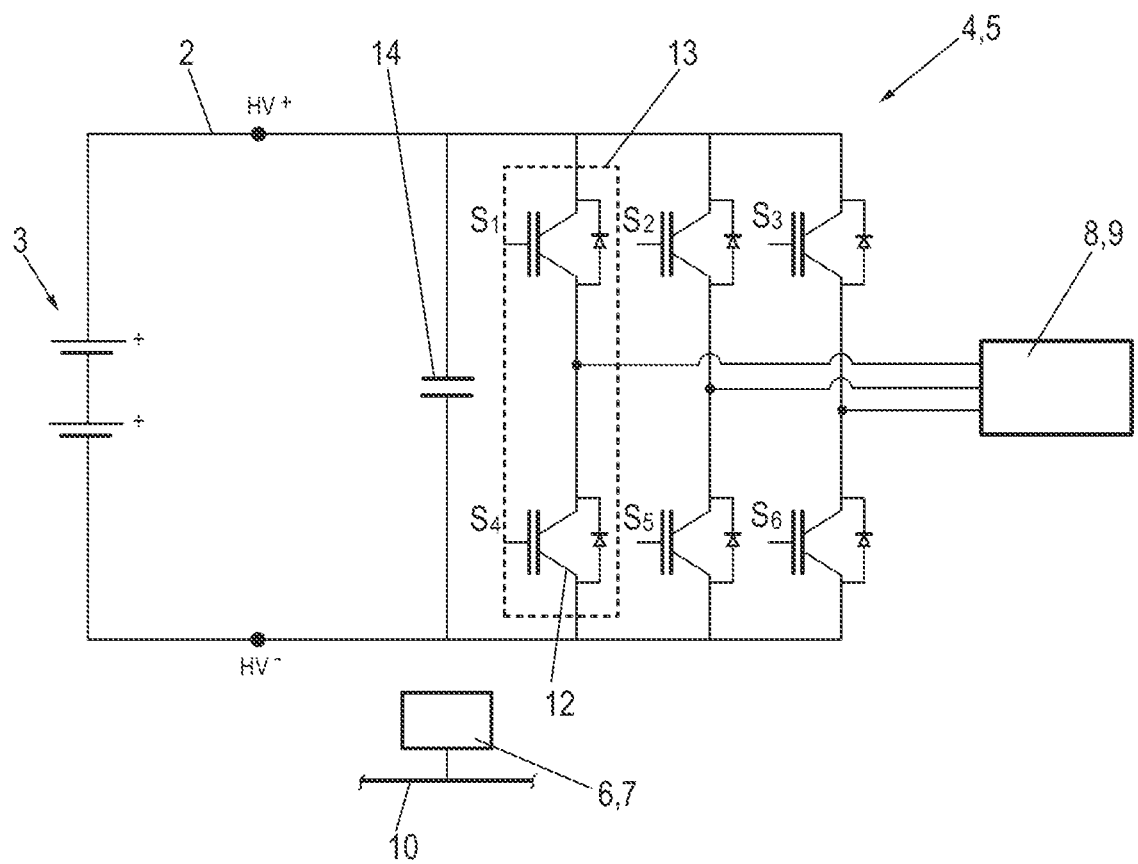
FIG. 2 shows a circuit diagram of an inverter.

FIG. 2 schematically shows the layout of the inverter 4. The further inverter 5 has a corresponding layout. It is evident that the inverter 4 includes six switching elements 12, which are designated S1-S6. In each case two of the switching elements 12, namely the switching elements S1 and S4, the switching elements S2 and S5 and the switching elements S3 and S6, each form a half-bridge 13. The three half-bridges 13 are each connected in parallel to an input of the inverter 4, which is connected to the output of the battery 3, here designated HV+ or HV−.

Each of the inverters 4, 5 includes a capacitor 14, which may also be referred to as an intermediate circuit capacitor. The capacitor 14 is connected in parallel with the inputs of the inverters 4, 5, which is to say between the HV+ and HV− potentials of the energy storage device 3. By means of the capacitor 14, alternating current ripples in the direct current network 2, which are generated due to the switching of the switching elements 12 of the inverters 4, 5, can be filtered. In order to further reduce the alternating current ripples in the direct current network 2 and thereby advantageously be able to use capacitors 14 with a lower capacitance and thus with lower manufacturing costs as well as a smaller installation size, a phase difference is formed between the clock signals with which the control units 6, 7 of the inverters 4, 5 respectively control the switching elements 12 of the inverters 4, 5. The phase difference between the clock signals is formed in such a way that the alternating current load of the direct current network 2 generated by the switching of the switching elements 12 of the inverters 4, 5 is minimal or at least reduced. This can be achieved, for example, by a phase offset of 180° between the control signals of the control units 6, 7.

For controlling the switching elements 12, the control units 6, 7 are each connected to the switching elements 12, in particular, to their gate terminals. The switching elements 12 are designed as semiconductor switching elements, in particular, as metal-oxide-semiconductor field-effect transistors (MOSFETs) or as bipolar transistors with insulating gate (IGBTs).

The control units 6, 7 each include a clock element (not shown), which is designed, for example, as a quartz oscillator and specifies the clock frequency for the clock signals with which the control units 6, 7 each control the switching elements 12. Since tolerances, brought about by the design, can occur between the clock frequencies specified in each case by the clocking elements, the control units 6, 7 get synchronized. In this case, synchronization takes place by means of a message which is sent by the further control unit 11 on the communication bus 10.

FIG. 3 shows an example of a message of a message type used for synchronization of the clock signals sent by the further control unit 11 on the communication bus 10. This is transmitted according to a voltage plotted on the vertical axis, which alternates between two voltage values V1 and V2. The synchronization of the clock signals can be performed on a rising edge, for example, the first edge of the message, consequently at the beginning of the reception of the message in the control units 6, 7. It is also possible for synchronization to occur on a falling edge, for example, the last edge of the message, such that synchronization is not performed until the message is fully received. Alternatively, a synchronization on a rising or falling edge between the beginning and the end of the message is also possible.

The message sent by the further control unit 11 on the communication bus 10 may contain a control command and/or at least one piece of information for at least one of the control units 6, 7 of the inverters 4, 5, consequently being addressed to at least one of the control units 6, 7. The control command and/or the information may, for example, include an operating state to be set by the respective control unit and/or a control specification to be used for controlling the switching elements 12 connected to the respective control unit 6 or 7. Additionally or alternatively to this, it is possible that the message transmitted by the further control unit 11 includes a control command and/or information for a further device (not shown) of the motor vehicle 1 connected to the communication bus 10, consequently that the message is addressed to a device other than the control units 6, 7.

The control unit 11 retransmits, in each case, a message of the particular message type after a fixed or variable period of time, wherein the different messages transmitted each correspond to the same message type but may contain different content, for example, different control commands and/or different information. The period of time between the sending of two successive messages by the further control device 11 on the communication bus 10 falls in an interval between 1 ms and 100 ms inclusive.

Even if the messages sent by the further control device 11 do not contain information and/or control commands for the respective control unit 6, 7, the messages of the further control device 11 are received and/or read by the control units 6, 7, so that a synchronization of the control units 6, 7, to these messages is possible, as has been described previously. Additionally or alternatively, it is possible that the messages of a message type used for synchronization of the clock signals are sent by more than one further control unit 11 on the communication bus 10.

The synchronization makes it possible for a fixed phase difference to be formed between the clock signals used by the control units 6, 7 to control the switching elements 12 of the inverters 4, 5. The control of the switching elements 12 with the clock signal in relation to the time of synchronization takes place as a function of a control specification assigned in each case to the control units 6, 7. The control specification can be stored in the control units 6, 7 and/or, in particular, can be transmitted to the control units 6, 7 in a recurring manner via the communication bus 10. For example, the control instruction can be transmitted to the control units 6, 7 by the further control unit 11 or an additional control device which is connected to the communication bus 10.

The controlling instructions assigned to the control units 6, 7 generate the phase difference between the clock signals of the control units 6, 7. The phase difference is thereby adjusted, in particular, in such a way that the alternating current voltage load in the direct current network 2 is minimized, or at least reduced. The phase difference can be specified, for example, the phase difference between the clock signals of the control units 6, 7 can be 360°/n, where n describes the number of inverters connected to the direct current network 2.

Additionally or alternatively to this, it is possible that the phase difference is determined as a function of a current operating state of at least one of the inverters 4, 5 or as a function of an operating state to be adjusted of at least one of the inverters 4, 5 and is transmitted, for example, to the control units 4, 5 as part of a control instruction via the communication bus 10. Additionally or alternatively to this, the phase difference can also occur as a function of a measured value describing a physical quantity in the direct current network, for example, a measured alternating current ripple in the direct current network 2. The phase difference can thereby be determined, for example, by the further control device 11 and/or determined by an additional control device which is connected to the communication bus 10 and transmitted to the control units 6, 7, in particular, via the communication bus 10. The further control unit can be connected to a sensor device (not shown) associated with the direct current network 2 for determining the measured value.

In order to further improve the forming of the phase difference between the clock signals of the control units 6, 7, the control units 6, 7 respectively count the control operations of the switching elements 12 performed after synchronization. A count information containing the counted control operations is respectively stored in the control units 6, 7. In doing so, the control unit 6 of the inverter 4 is, for example, a master control unit, which at a point in time transmits to the control unit 7 of the inverter 5 the count information describing the control operations counted, at that point in time, by the master control unit 6. The point in time may, for example, be defined as a function of the respective synchronization points in time and stored accordingly in the control units 6, 7 and/or transmitted as part of the count information.

The control unit 7, which receives the count information from the control unit 6, may determine the plausibility of and/or adjust its own count information as a function of the count information transmitted by the master control unit 6.

For this purpose, the control unit 7 can control the at least one switching element 12 of the inverter 5 as a function of the own count information of the control unit 7 as well as the count information transmitted by the master control unit 6. This makes it possible for a time-dependent or time-fluctuating difference between the clock signals to be at least partially compensated and/or balanced out.

The communication bus 10 is implemented, for example, as a CAN bus or as a FlexRay bus. In addition to the control units 6, 7 as well as the further control unit 11, the communication bus 10 can interconnect additional control units or control unit of the motor vehicle 1 and enable data transmission between the control units. The further control unit 11 can perform various functions in the motor vehicle 1. The message sent by the further control unit 11 at different times via the communication bus 10 may be of different message types. For example, it may be control commands for the control units 6, 7 or the inverters 4, 5. On top of this, alternatively, a message can be used, which message, for example, transmits a temperature of the energy storage system 3, an operating status of another component of the motor vehicle 1, for example, a sensor or an airbag, or the like via the communication bus 10.

In addition to the two three-phase inverters 4, 5, further inverters can be connected to the direct current network 2 and operated in synchronization or alternatively under the effect of the forming of a phase difference between their respective clock signals in accordance with the preceding embodiments. The inverters 4, 5 and/or further inverters of the motor vehicle 1 may have a different number of phases, in particular, one or more of the inverters connected to the direct current network 2 may have more than three phases on the alternating current side and/or more than two direct current potentials on the direct current side.

Patent Application No. 102020124496.7, filed in Germany on Sep. 21, 2020, to which this application claims priority, is hereby incorporated herein by reference, in its entirety.

Aspects and features of the various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method, comprising:
   operating at least two inverters connected to a direct current network, wherein the at least two inverters each include a respective switching element and a respective control unit connected to a common communication bus;
   controlling, with the control unit of each of the at least two inverters, each inverter with a respective clock signal, wherein the common communication bus is connected to at least one further control unit;
   sending, at different times with the further control unit, a message of a message type via the common communication bus;
   triggering, by reception of the message of the message type in the control unit of the at least two inverters, a synchronization of the clock signal controlling each of the at least two inverters;
   counting, with the control unit of each of the at least two inverters, control operations carried out after the synchronization of the clock signal controlling each of the at least two inverters, wherein the control unit of a first one of the at least two inverters is a master control unit;
   transmitting, with the master control unit, to the control unit of a second one of the at least two inverters at a point of time count information that describes the control operations counted at the point in time by the master control unit, wherein the first one of the at least two inverters is different from the second one of the at least two inverters;
   receiving the count information with the control unit of the second one of the at least two inverters; and
   controlling, with the control unit of the second one of the at least two inverters, the switching element of the second one of the at least two inverters as a function of the count information and the control operations counted by the control unit of the second one of the at least two inverters.

2. The method according to claim 1, wherein the message sent by the further control unit contains at least one control command or at least one item of information for the control unit of one or more of the at least two inverters or for a further device connected to the common communication bus.

3. The method according to claim 1, further comprising resending the messages of the message type after a fixed or variable period of time.

4. The method according to claim 3, wherein the period of time falls in an interval between 1 ms and 100 ms inclusive.

5. The method according to claim 1, wherein the synchronization of the clock signal controlling each of the at least two inverters takes place on a rising edge or a falling edge of the message.

6. The method according to claim 1, wherein in each of the at least two inverters, control of the switching element with the clock signal takes place with reference to the point of time of the synchronization of the clock signal controlling each of the at least two inverters as a function of a control specification assigned to the respective control unit.

7. The method according to claim 6, wherein the control specification is stored in the control unit of each of the at least two inverters or the control specification is transmitted to the control unit of each of the at least two inverters in a recurring manner via the common communication bus.

8. The method according to claim 6, wherein a phase difference between the clock signal controlling each of the at least two inverters is generated by control instructions assigned to the control unit of each of the at least two inverters, wherein the phase difference is set such that an alternating current voltage load on the direct current network generated by the switching of the switching elements of the at least two inverters is minimal or at least reduced.

9. The method according to claim 8, wherein the phase difference is determined as a function of a current operating state of at least one of the at least two inverters or as a function of an operating state to be adjusted of at least one of the at least two inverters or as a function of a measured value describing a physical quantity in the direct current network.

10. The method according to claim 1, wherein at least two of the at least two inverters each operate a traction electric motor of a motor vehicle or using a communication bus of a motor vehicle.

11. The method according to claim 1, wherein the direct current network includes an electrical energy storage system, a traction energy storage system of a motor vehicle, or at least one fuel cell system.

12. A motor vehicle, comprising:
- a direct current network;
- a common communication bus;
- two inverters each connected to the direct current network, wherein the two inverters each include:
  - a respective control unit connected to the common communication bus; and
  - a respective switching element which, in operation, is controlled by the control unit of the corresponding inverter with a clock signal; and
- a further control unit connected to the common communication bus, wherein the further control unit, in operation, sends a message via the common communication bus at different times,
- wherein the control unit of each of the two inverters, in operation, counts control operations carried out after synchronization of the clock signal controlling each of the two inverters,
- wherein the control unit of a first one of the two inverters is a master control unit,
- wherein the master control unit, in operation, transmits to the control unit of a second one of the two inverters at a point of time count information that describes the control operations counted at the point in time by the master control unit,
- wherein the first one of the two inverters is different from the second one of the two inverters;
- wherein the control unit of the second one of the two inverters, in operation, receives the count information, and
- wherein the control unit of the second one of the two inverters, in operation, controls the switching element of the second one of the two inverters as a function of the count information and the control operations counted by the control unit of the second one of the two inverters.

* * * * *